Patented Jan. 2, 1951

2,536,893

UNITED STATES PATENT OFFICE 2,536,893

PRODUCTION OF ALKALI-RESISTANT ALGINATE MATERIALS

John Bamber Speakman and Norman Henry Chamberlain, Leeds, and Catherine Margaret Cameron Dorkin, York, England, assignors to Alginate Industries Limited, London, England, a British company No Drawing. Application April 22, 1948, Serial No. 22,697

10 Claims. (Cl. 8—115.5)

1

This invention comprises improvements in or relating to the production of alkali-resistant alginate materials. The production of alginic acid or alginates such as calcium alginate which are insoluble in water is well known. By extruding a solution of a soluble salt of alginic acid such as sodium alginate through suitable orifices into a solution of a mineral acid, films or filaments of alginic acid can be obtained. If the solution into which the material is extruded is calcium chloride slightly acidified with hydrochloric acid the film or filaments are of calcium alginate. Alginic acid and most alginates, however, are readily soluble in aqueous solutions of alkalis, such as sodium carbonate or soap, and it has been proposed to render them insoluble in alkali or alkali resistant by treatment with chromium or beryllium compounds as set forth in British Patents Nos. 541,847 and 545,872. It has also been proposed to render such materials alkali resistant by treatment with formaldehyde as set forth in British Patent No. 572,798.

It is an object of the present invention to provide an alternative process to those described which will give superior results.

According to the present invention, a process of preparation of alkali-resistant alginic material consists in treating an alginic starting substance (that is to say alginic acid or metal alginate having at least a part of its carboxyl groups free) with di-epoxy compounds so as to produce cross linkages thereof with the hydroxyl and carboxyl groups of the alginic substance.

Di-epoxy compounds are capable of reacting with hydroxyl groups and carboxyl groups as follows:

(1)
R—OH + CH$_2$—CH—R'—CH—CH$_2$ + R—OH ⟶
\\O/ \\O/

R—O—CH$_2$—CH(OH)R'CH(OH)—CH$_2$—O—R (2)
R—COOH + CH$_2$—CH—R'—CH—CH$_2$ + R—COOH ⟶
\\O/ \\O/

R—CO—O—CH$_2$—CH(OH)—R'CH(OH)—CH$_2$—O—OCR

In these equations R represents a radical of the alginic acid material and R' represents a hydrocarbon radical of the di-epoxy compound.

By using a compound containing two epoxy groups, it should, therefore, be possible to cross-link neighbouring alginic acid molecules through their hydroxyl and carboxyl groups, where free, and this has, in fact been found to be the case. This method of preparing alkali-resistant material is superior to the formaldehyde treatment before referred to because by the formaldehyde treatment carboxyl groups are not cross linked whereas by the present treatment both carboxyl and hydroxyl groups are cross linked.

The treatment may be carried out by first swelling the alginic material in water, then displacing the water by a polar solvent, for example alcohol, which maintains sufficient swelling to keep the hydroxyl groups accessible and thereafter bringing about cross linking by treating the alginic material with a di-epoxy compound (for example by boiling in a solution of the di-epoxy compound in alcohol).

While one important aspect of the invention lies in the application of the process to the treatment of the alginic substance in the form of films or fibres, the invention is not limited to the treatment of films or fibres but includes the production of alkali-resistant alginic material in all forms in which it may be useful, for example in the form of moulding powder for the production of plastics and the like.

It is within the scope of the invention to render the material resistant to alkalis by cross linking partially with other compounds such as compounds of metals of high coordinating power (chromium or beryllium) or with formaldehyde or a formaldehyde resin, and partially by cross linking with the epoxy compounds. In this connection it may be pointed out that whereas some metal alginates are non-inflammable, alginic substances which have been treated with di-epoxy compounds alone are inflammable. By cross-linking alginic material by treatment with metal salts as well as with epoxy compounds it is possible to combine a high degree of non-inflammability with the exceptional resistance to alkalis obtained according to the present invention.

The following is a description, by way of example, of one instance of the carrying of the invention into effect:

Example

A hank of alginic acid was allowed to swell in water, then transferred to alcohol-water mixture of increasing concentration, and finally to absolute alcohol. The hank was then boiled for 24 hours under reflux with a solution of 10 per cent (by weight) of hexadiene dioxide in absolute alcohol. The formula for hexadiene dioxide is:

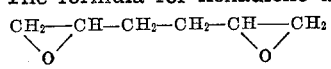

The hank was then removed, centrifuged, conditioned for 10 days at 22.2° C. and 65% relative humidity, and reweighed. The gain in weight due to the treatment was 29.4%.

Whereas a hank which had merely been boiled for 24 hours under reflux with absolute alcohol alone dissolved in a solution of soap (0.2%) and soda (0.2%) in three minutes at room temperature, the hank which had been treated with hexadiene dioxide was dissolved only to the extent of 3% after 24 hours immersion in the solution of soap and soda.

The water adsorptive capacity at 65% relative humidity in the case of the untreated alginic acid yarn was 18.7%, and in the case of the yarn treated by the above process was only 10.6% and this reduction in water adsorptive capacity is beneficial.

We claim:

1. A process of preparation of alkali-resistant alginate material consisting in esterifying and etherifying an alginic material selected from the group consisting of alginic acid and water-insoluble metal alginates having at least a part of their carboxyl groups free, with an aliphatic hydrocarbon epoxy compound having two epoxy groups containing oxygen linking two adjoining carbons only, until the epoxy compound has combined with both hydroxy and carboxyl groups of molecules of the alignate material and so linked them together.

2. A process as claimed in claim 1 wherein the alginic material is in film form.

3. A process as claimed in claim 1 wherein the alginic material is in the form of fibres.

4. A process of preparation of alkali-resistant alginate material consisting in first swelling in water an alginic material, selected from the group consisting of alginic acid and water-insoluble metal alginates having at least a part of their carboxyl groups free, then displacing the water by a polar solvent which maintains sufficient swelling to keep the hydroxyl groups accessible, then esterifying and etherifying the swollen solvent-containing alginic material with an aliphatic hydrocarbon epoxy compound having two epoxy groups containing oxygen linking two adjoining carbons only, until the epoxy compound has combined with both hydroxy and carboxyl groups of molecules of the alginate material and so linked them together.

5. A process as claimed in claim 4 wherein the aliphatic hydrocarbon is hexadiene dioxide.

6. A process as claimed in claim 4 wherein the polar solvent is an alcohol.

7. A process as claimed in claim 4 wherein the alginic material is alginic acid.

8. A process as claimed in claim 4 wherein the alginic material is partially rendered resistant to alkalis by reacting it with compounds of metals of high co-ordinating power, part of the hydroxy groups remaining free after said reaction, and partially by esterifying and etherifying it with the said aliphatic hydrocarbon having two epoxy groups containing oxygen linking two adjoining carbons only.

9. A process as claimed in claim 4 wherein the alginic material is partially rendered resistant to alkalis by reacting it with formaldehyde, part of the hydroxy groups remaining free after said reaction, and partially by esterifying and etherifying it with the said aliphatic hydrocarbon having two epoxy groups containing oxygen linking two adjoining carbons only.

10. A process as claimed in claim 4 wherein the aliphatic hydrocarbon epoxy compound has two epoxy groups containing oxygen linking two adjoining carbons only and has at least six carbon atoms in the chain.

JOHN BAMBER SPEAKMAN.
NORMAN HENRY CHAMBERLAIN.
CATHERINE MARGARET
          CAMERON DORKIN.

REFERENCES CITED

The following references are of record in the file of this patent:

UNITED STATES PATENTS

| Number | Name | Date |
|---|---|---|
| 2,131,120 | Schlack | Sept. 27, 1938 |
| 2,238,949 | Schlack | Apr. 22, 1941 |
| 2,426,125 | Steiner | Aug. 19, 1947 |
| 2,463,824 | Steiner et al. | Mar. 8, 1949 |

FOREIGN PATENTS

| Number | Country | Date |
|---|---|---|
| 489,940 | Great Britain | Aug. 22, 1938 |
| 518,225 | Great Britain | Feb. 21, 1940 |
| 520,899 | Great Britain | May 7, 1940 |